United States Patent
Ida

(10) Patent No.: US 10,201,855 B2
(45) Date of Patent: Feb. 12, 2019

(54) CUTTING INSERT, TOOL BODY AND CUTTING TOOL

(71) Applicant: TUNGALOY CORPORATION, Fukushima (JP)

(72) Inventor: Takehiro Ida, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 91 days.

(21) Appl. No.: 15/541,606

(22) PCT Filed: May 17, 2016

(86) PCT No.: PCT/JP2016/064621
§ 371 (c)(1),
(2) Date: Jul. 5, 2017

(87) PCT Pub. No.: WO2016/186113
PCT Pub. Date: Nov. 24, 2016

(65) Prior Publication Data
US 2017/0341152 A1    Nov. 30, 2017

(30) Foreign Application Priority Data

May 20, 2015 (JP) ................................. 2015-103244

(51) Int. Cl.
*B23C 5/22* (2006.01)
*B23B 27/04* (2006.01)
(Continued)

(52) U.S. Cl.
CPC .............. *B23B 27/04* (2013.01); *B23B 27/14* (2013.01); *B23B 27/145* (2013.01); *B23B 27/16* (2013.01); *B23B 2200/0423* (2013.01)

(58) Field of Classification Search
CPC . B23B 27/1662; B23B 27/1614; B23B 27/04; B23B 27/145; B23B 27/1622;
(Continued)

(56) References Cited

U.S. PATENT DOCUMENTS

| | | | |
|---|---|---|---|
| 4,602,897 A | 7/1986 | Teets | |
| 5,032,050 A * | 7/1991 | Niebauer | ............... B23B 27/045 407/114 |

(Continued)

FOREIGN PATENT DOCUMENTS

| | | |
|---|---|---|
| CN | 101652214 A | 2/2010 |
| DE | 10-2009-040840 A1 | 3/2011 |

(Continued)

OTHER PUBLICATIONS

International Search Report issued in PCT/JP2016/064621; dated Jun. 21, 2016.

(Continued)

*Primary Examiner* — Will Fridie, Jr.
(74) *Attorney, Agent, or Firm* — Studebaker & Brackett PC

(57) ABSTRACT

A cutting insert having a first end surface, a second end surface, and a peripheral side surface. The peripheral side surface includes a rake surface, a front flank and a first cutting edge located in an intersecting edge between the rake surface and the front flank. The first end surface includes a central surface and a side flank located closer to the front flank as compared to the central surface. An intersecting edge between the central surface and the peripheral side surface serves as a first edge, and an intersecting edge between the side flank and the peripheral side surface serves as a second edge, and an angle formed by the first cutting edge and the first edge serves as a first angle $\alpha$, and an angle (Continued)

formed by the first cutting edge and the second edge serves as a second angle β, wherein α is smaller than β.

14 Claims, 12 Drawing Sheets

(51) Int. Cl.
 *B23B 27/14* (2006.01)
 *B23B 27/16* (2006.01)
(58) Field of Classification Search
 CPC .......... B23B 29/043; B23B 2200/0419; B23B 2200/048; B23B 2200/049; B23B 2200/0495; B23B 2205/12; B23C 2200/0472; B23C 2200/0487; B23C 2210/168
 See application file for complete search history.

(56) References Cited

U.S. PATENT DOCUMENTS

| | | | | |
|---|---|---|---|---|
| 7,909,546 | B2* | 3/2011 | Nada | B23B 27/065 407/113 |
| 9,103,418 | B2* | 8/2015 | Hecht | B23B 27/1622 |
| 9,216,463 | B2* | 12/2015 | Hecht | B23B 27/007 |
| 9,421,614 | B2* | 8/2016 | Morgulis | B23B 27/065 |
| 9,421,615 | B2* | 8/2016 | Hecht | B23B 27/1662 |
| 2007/0231089 | A1* | 10/2007 | Hecht | B23B 27/04 407/113 |
| 2008/0240872 | A1 | 10/2008 | Rimet | |
| 2008/0240880 | A1 | 10/2008 | Durand | |
| 2010/0329800 | A1* | 12/2010 | Edler | B23B 27/145 407/114 |
| 2012/0099935 | A1* | 4/2012 | Hecht | B23B 27/1614 407/100 |
| 2013/0051943 | A1 | 2/2013 | Koontz | |

FOREIGN PATENT DOCUMENTS

| | | |
|---|---|---|
| EP | 1935538 A1 | 6/2008 |
| JP | S62-29204 U | 2/1987 |
| JP | S62-81504 U | 5/1987 |
| JP | 2003-011005 A | 1/2003 |
| KR | 2014-0002631 A | 1/2014 |
| KR | 2014-0069616 A | 6/2014 |
| WO | 2011/031754 A1 | 3/2011 |

OTHER PUBLICATIONS

International Preliminary Report on Patentability and Written Opinion issued in PCT/JP2016/064621 dated Nov. 21, 2017.

* cited by examiner

CUTTING INSERT, TOOL BODY AND CUTTING TOOL

TECHNICAL FIELD

The present invention relates to a cutting insert which is removably mounted on a cutting tool, a tool body on which such cutting insert is mounted, and a cutting tool.

BACKGROUND ART

Patent Document 1 discloses a conventional cutting insert, tool body and cutting tool. That is, such cutting insert is a cutting insert having two end surfaces (an upper surface 2, a lower surface 3) and a peripheral side surface (a side surface 4) connecting these end surfaces, and the peripheral side surface includes a linear front cutting edge (a cutting edge 5), a rake surface and a front flank 9. The front cutting edge and one of the end surfaces (the lower surface 3) form an acute angle. To put it another way, as viewed from a direction facing the rake surface, the front cutting edge and an intersecting edge between one of the end surfaces (the lower surface 3) and the peripheral side surface form an angle which is smaller, by an angle α, than 90°, i.e., an acute angle. Patent Document 1 also discloses a tool body and a cutting tool on which such cutting insert is mounted. The cutting insert, tool body and cutting tool of Patent Document 1 are adapted to grooving or parting.

CITATION LIST

Patent Documents

Patent Document 1: JP2003-011005 A

SUMMARY

Technical Problem

As to the conventional cutting insert, tool body and cutting tool of Patent Document 1, chips may become caught in between an end surface of the cutting insert and a workpiece when grooving is performed on a corner of the workpiece, leading to the occurrence of damage in the workpiece or in the cutting insert. In other words, as viewed from the direction facing the rake surface, the angle formed by the front cutting edge and the intersecting edge between the lower surface and the peripheral side surface is slightly smaller than 90° (the angle α is approximately from 1° to 2°), and this leads to a small gap between the lower surface and the workpiece, resulting in a problem in that chips are likely to become caught in such gap.

Solution to Problem

A cutting insert according to the present invention is a cutting insert having a first end surface, a second end surface opposing the first end surface, and a peripheral side surface connecting the first and second end surfaces, wherein the peripheral side surface includes a rake surface, a front flank and a first cutting edge located in an intersecting edge between the rake surface and the front flank. The first end surface includes a central surface and a side flank located closer to the front flank as compared to the central surface. As viewed from a direction facing the rake surface, an intersecting edge between the central surface and the peripheral side surface serves as a first edge, and an intersecting edge between the side flank and the peripheral side surface serves as a second edge, and when, as viewed from the direction facing the rake surface, an angle formed by the first cutting edge and the first edge serves as a first angle α, and an angle formed by the first cutting edge and the second edge serves as a second angle β, the first angle α is smaller than the second angle β.

A tool body according to the present invention is a tool body of a cutting tool for having the cutting insert of the present invention mounted thereon, wherein the tool body comprises a bottom surface of an insert seat which comes into contact with the second end surface of the cutting insert.

A cutting tool according to the present invention is a cutting tool comprising the cutting insert of the present invention.

Advantageous Effects of Invention

According to the present invention, chips are restrained or prevented from becoming caught in between the cutting insert and the workpiece.

DESCRIPTION OF EMBODIMENTS

Figure 1:
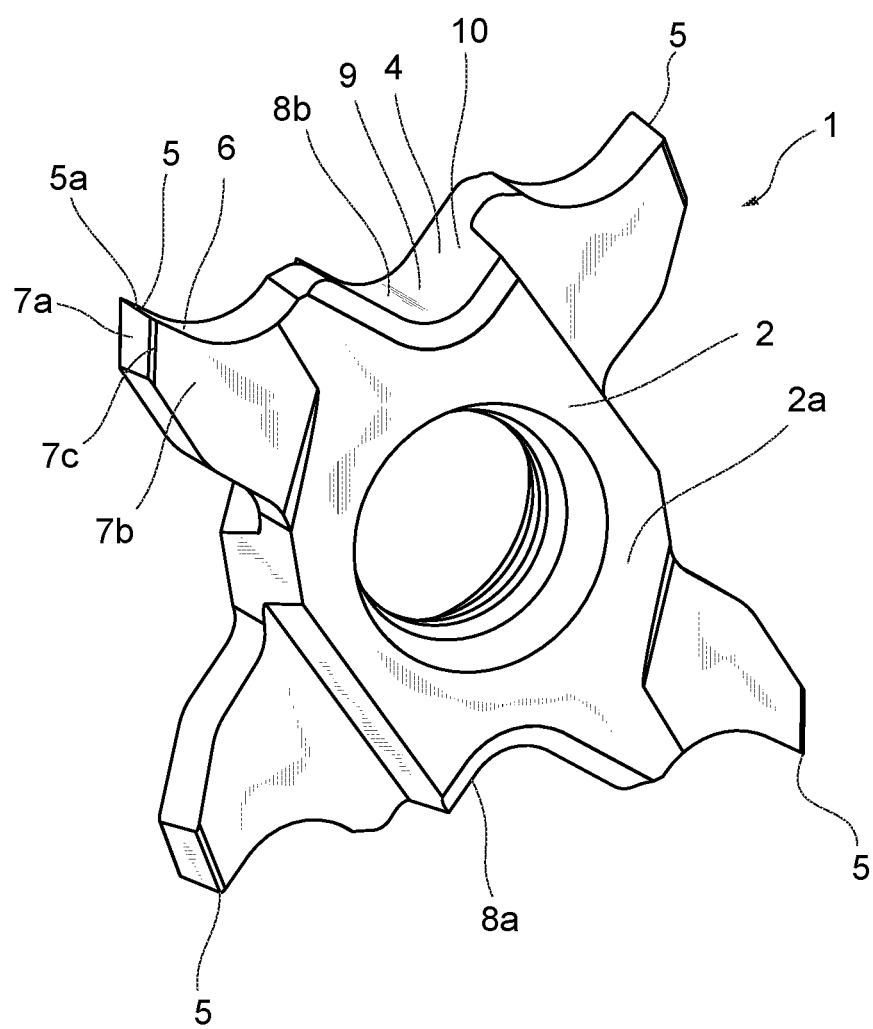
FIG. 1 is a perspective view of a cutting insert according to an embodiment of the present invention.
Figure 2:
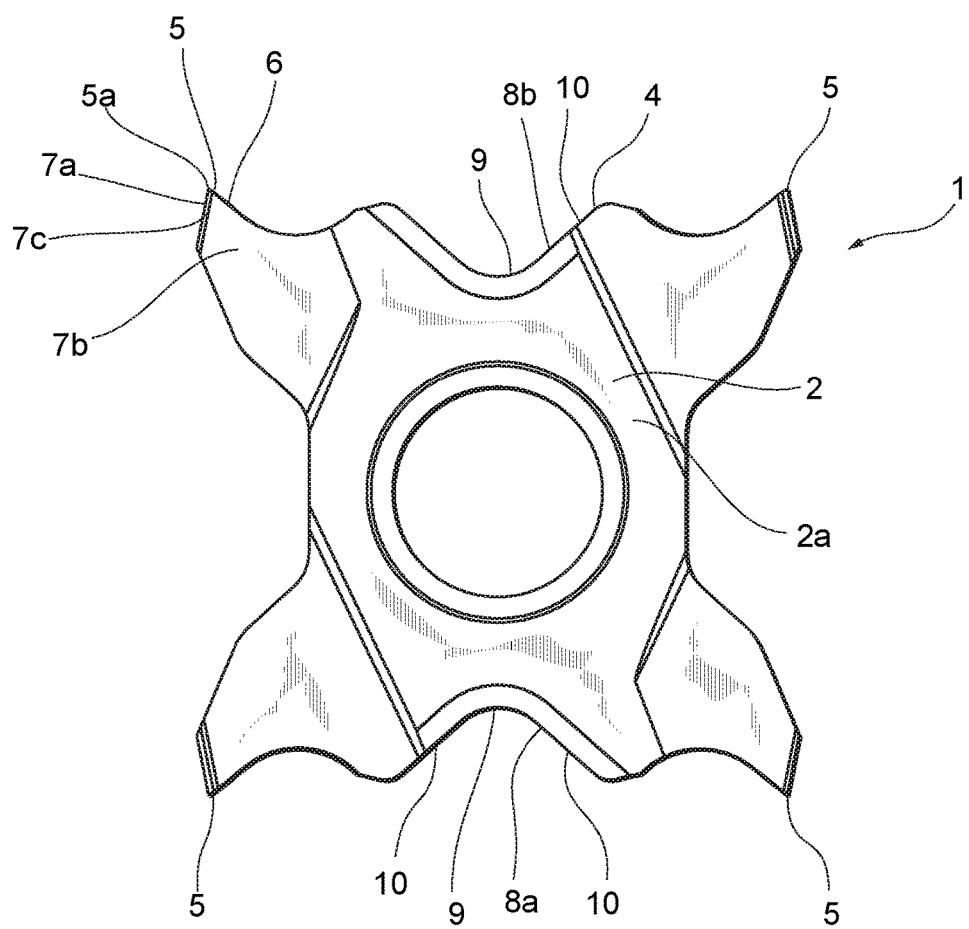
FIG. 2 is a right side view of the cutting insert shown in FIG. 1.
Figure 3:
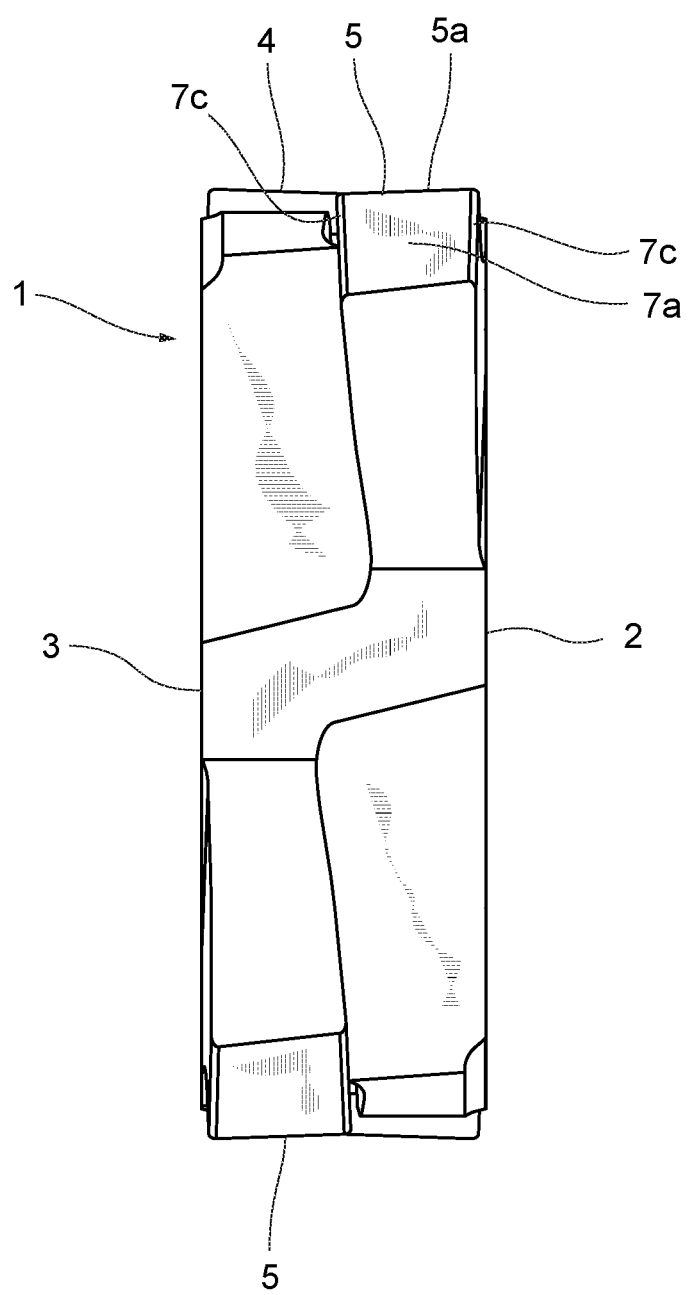
FIG. 3 is a front view of the cutting insert shown in FIG. 1.

A cutting insert, a tool body and a cutting tool according to an embodiment to which the present invention is applied will now be described with reference to the attached drawings. As shown in FIGS. 1 to 5, a cutting insert 1 of the present embodiment has two opposing end surfaces 2, 3 and a peripheral side surface 4. The peripheral side surface 4 connects the two end surfaces 2, 3. A through hole is provided substantially in the center of each of the two end surfaces 2, 3. As shown in FIG. 2, a contour shape of the two end surfaces 2, 3 has four corners. The peripheral side surface 4 comprises four cutting edges 5 at positions corresponding to the four corners. Each cutting edge 5 is formed in an intersecting edge between a rake surface 6 and a flank. The rake surface 6 is formed in the peripheral side surface 4. The respective four cutting edges are provided so as to form a shape of 180-degree rotational symmetry. As viewed from each of the directions respectively facing the two end surfaces 2, 3, the cutting insert 1 has a shape of 180-degree rotational symmetry. Further, the cutting insert 1 has a shape of 180-degree rotational symmetry with respect to a direction in which the two end surfaces 2, 3 are inverted so as to be reversed with each other. Therefore, even if one of the cutting edges 5 is damaged and thus becomes unusable, this cutting insert 1 can be used at least four times by changing the direction of the cutting insert 1 so that the damaged cutting edge 5 is replaced with each of the other three cutting edges 5, which is economical. The four cutting edges 5 share the same shape and function, and thus, the below description will be made for only one of the cutting edges 5, and the description for the other three cutting edges 5 will be omitted here. In FIG. 2, a lateral distance between the corners where the respective cutting edges 5 are formed is approximately 18 mm. A vertical distance between the corners is approximately 20 mm. A thickness, being a dimension between the two end surfaces 2, 3, is approximately 4 mm. However, the dimensions are not limited thereto. It should be noted that, although terms indicating the positions and directions in space, for example, vertical and lateral ones, may be used in the description, such terms do not limit the present invention and are not intended to be used to interpret the present invention in a limited manner.

The peripheral side surface 4 further comprises a front flank 7a. Herein, the cutting edge 5 formed in an intersecting edge between the front flank 7a and the rake surface 6 is called a first cutting edge 5a. The cutting edge 5 includes a first corner cutting edge 5b which is connected to one of the ends of the first cutting edge 5a and a second corner cutting edge 5c which is connected to the other end of the first cutting edge 5a. The cutting edge 5 further includes a first side cutting edge 5d which is connected to the first corner cutting edge 5b and a second side cutting edge 5e which is connected to the second corner cutting edge 5c. In other words, the cutting edge 5 is constituted, in the following order, by the first side cutting edge 5d, the first corner cutting edge 5b, the first cutting edge 5a, the second corner cutting edge 5c and the second side cutting edge 5e. One of the two end surfaces serves as the first end surface 2, and the other end surface serves as the second end surface 3. Herein, an end surface on the first side cutting edge 5d side serves as the first end surface 2. When the first cutting edge 5a serves as an active cutting edge, the second end surface 3 has a seating surface which comes into contact with an insert seat 22 of a tool body 21. The first end surface 2 includes a central surface 2a. The central surface 2a acts as a seating surface when the cutting insert 1 is used after inverting the first end surface 2 and the second end surface 3.

The first end surface 2 includes a side flank 7b which is formed so as to be closer to the front flank 7a than the central surface 2a. In the cutting insert 1 of the present embodiment, an intersecting edge between the side flank 7b and the rake surface 6 is provided with the first side cutting edge 5d. It should be noted that a flank corresponding to the first corner cutting edge 5b can be called a corner flank 7c. The side flank 7b is adjacent to the front flank 7a across the corner flank 7c. In other words, the side flank 7b is connected to the front flank 7a via the corner flank 7c. Further, the side flank 7b is connected to the central surface 2a via a connecting surface. The connecting surface of the cutting insert 1 of the present embodiment is formed in a stepped shape, but the shape is not limited thereto. This connecting surface may have any shape, as long as it is capable of connecting the side flank 7b and the central surface 2a. Further, a connecting surface may not be formed so that the side flank 7b and the central surface 2a are directly connected to each other. The rake surface 6 is curved in a recessed shape so as to form a chip breaker. The chip breaker provides a positive rake angle, and this can achieve reduced cutting resistance. The chip breaker is not limited to having the shape in the present embodiment and may employ various known shapes. The cutting insert 1 of the present embodiment is suited for grooving or parting.

Figure 4:
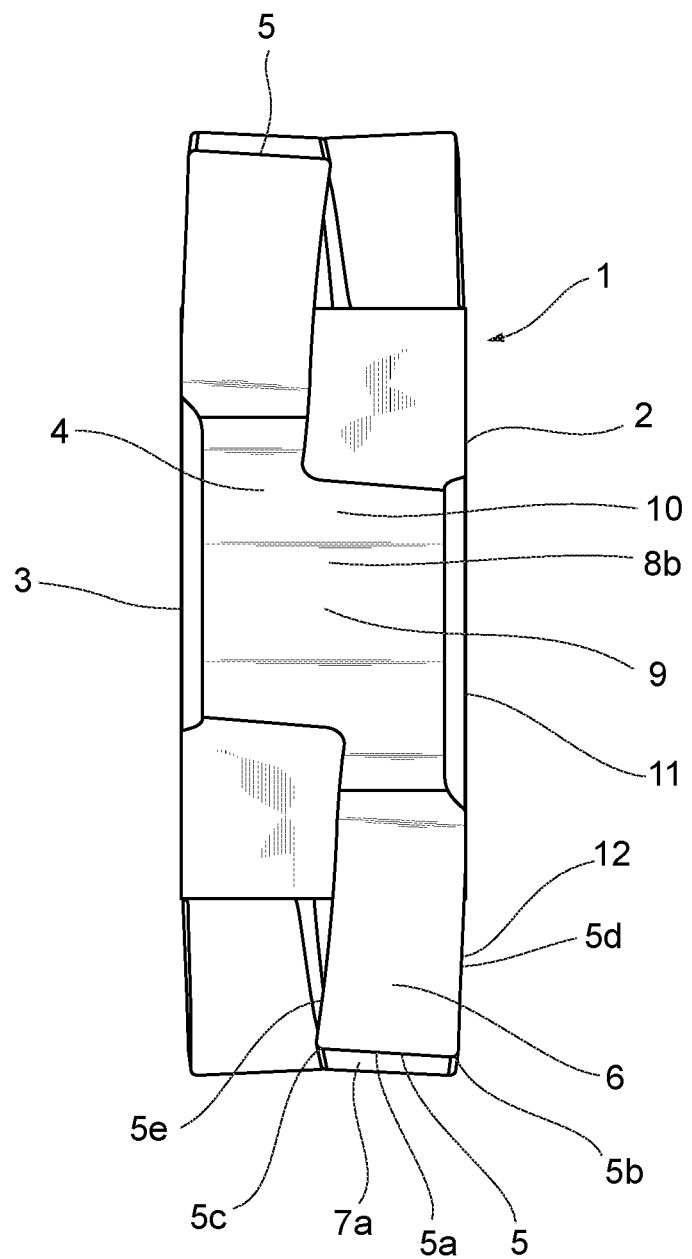
FIG. 4 is a plan view of the cutting insert shown in FIG. 1.
Figure 5:
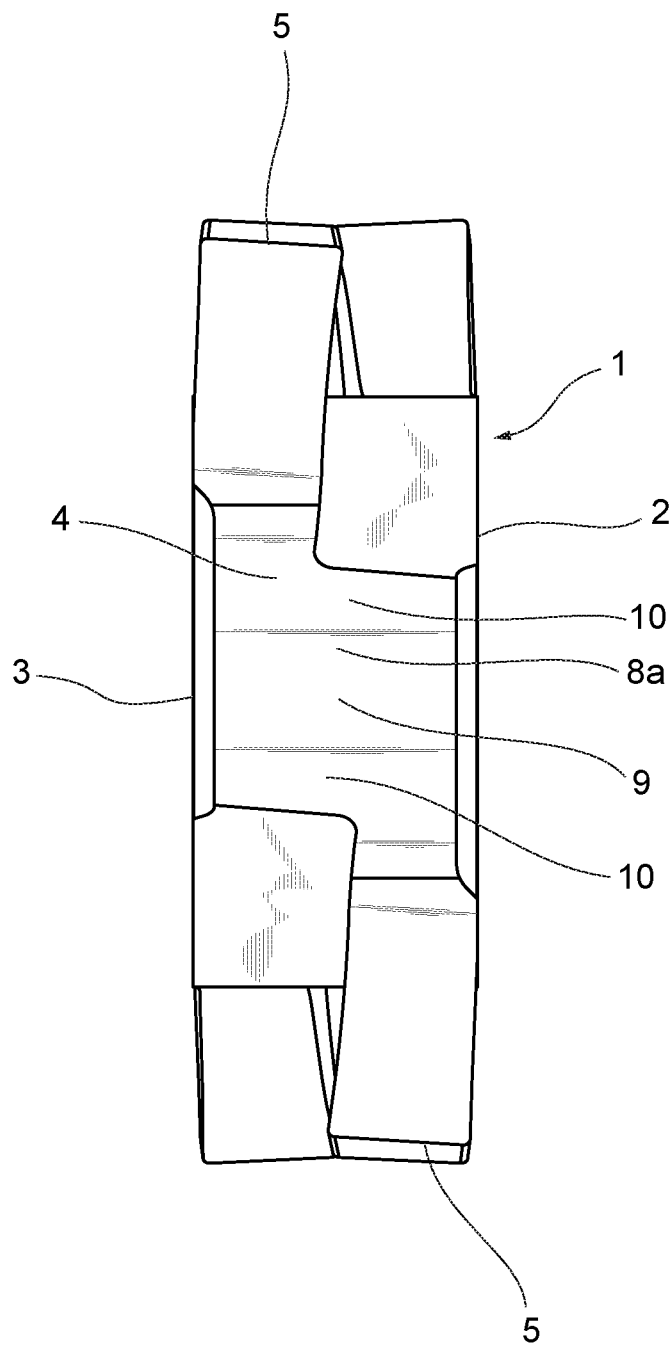
FIG. 5 is a bottom view of the cutting insert shown in FIG. 1.
Figure 6:
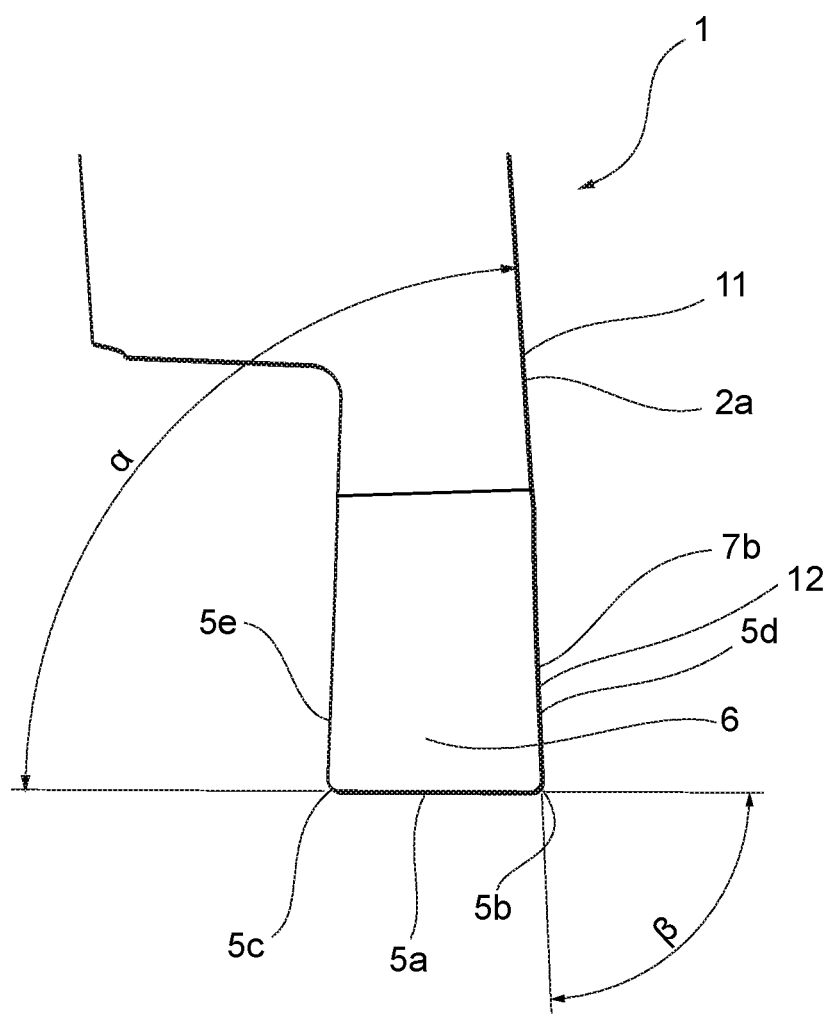
FIG. 6 is a schematic view in which the cutting insert shown in FIG. 1 is viewed from a direction facing a rake surface.
Figure 7:
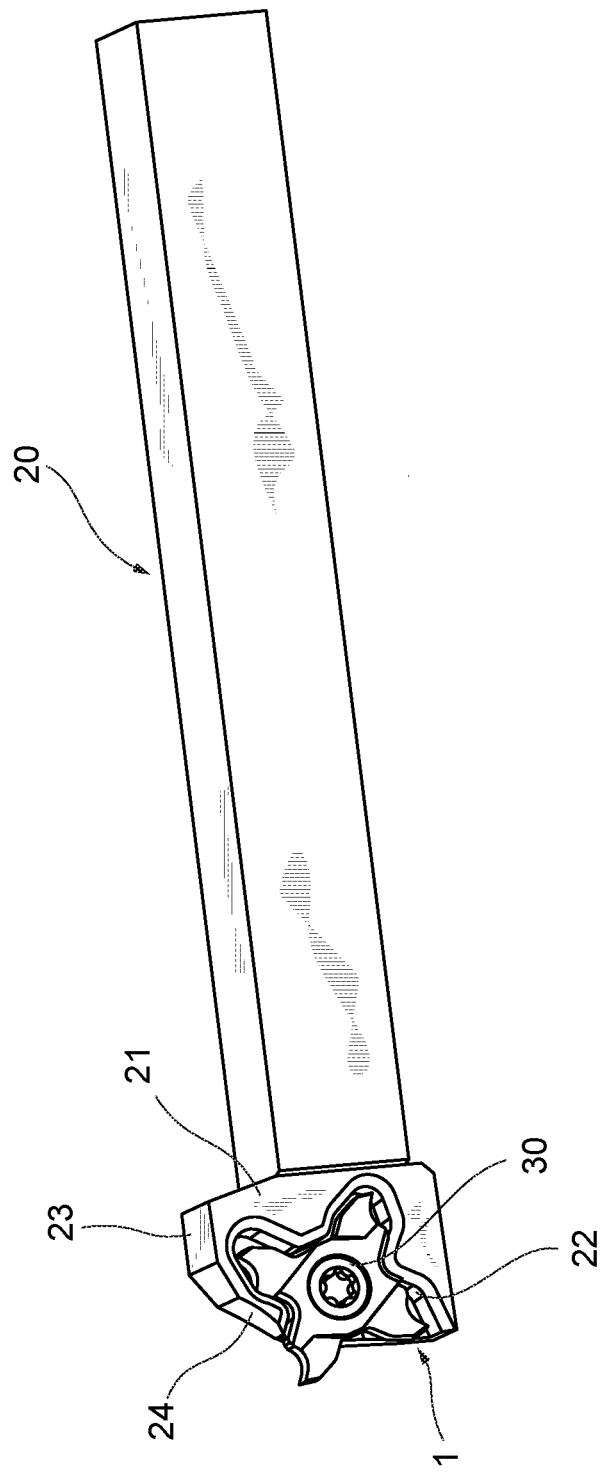
FIG. 7 is a perspective view of a cutting tool according to the embodiment of the present invention.

Herein, as shown in FIG. 4, as viewed from a direction facing the rake surface 6, an intersecting edge between the central surface 2a and the peripheral side surface 4 is defined as a first edge 11, and an intersecting edge between the side flank 7b and the rake surface 6 is defined as a second edge 12. Further, as schematically shown in FIG. 6, as viewed from the direction facing the rake surface 6, an angle formed by the first cutting edge 5a and the first edge 11 is defined as a first angle $\alpha$, and an angle formed by the first cutting edge 5a and the second edge 12 is defined as a second angle $\beta$. The first angle $\alpha$ is made smaller than the second angle $\beta$. It should be noted that, in the cutting insert 1 of the present embodiment, the second edge 12 matches the first side cutting edge 5d. By making the first angle $\alpha$ be smaller than the second angle $\beta$, the first side cutting edge 5d and the first edge 11 of the central surface 2a are arranged so as to form a bend therebetween as viewed from the direction facing the rake surface 6. It should be noted that, when, as in the cutting insert 1 of the present embodiment, the rake surface 6 is a curved surface, the direction facing the rake surface 6 refers to a direction facing the peripheral side surface 4 including the rake surface 6, i.e., refers to the plan view shown in FIG. 4.

Materials used for the cutting edges 5 of the cutting insert 1 and its peripheral area may be selected from a cemented carbide, cermet, ceramic, diamond, hard materials such as a sintered body containing cubic boron nitride, and materials obtained by applying PVD or CVD coating to the surface of these hard materials. Portions of the cutting insert 1 other than the cutting edge 5 are preferably made of similarly hard materials.

As shown in FIGS. 7 to 12, when the cutting insert 1 is mounted on the tool body 21, the second end surface 3 comes into contact with a bottom surface 22a of an insert seat 22, and the peripheral side surface 4 comes into contact with two wall surface portions 22b1, 22b2 of the insert seat. The bottom surface 22a of the insert seat 22 is a surface which comes into contact, via the widest area, with the cutting insert 1. The wall surface portions 22b1, 22b2 of the insert seat 22 are surfaces which stand up as walls with respect to the bottom surface 22a. The peripheral side surface 4 of the cutting insert 1 comprises first and second holding portions 8a, 8b, which are holding portions which come into contact with the wall surface portions 22b1, 22b2 of the insert seat 22. Herein, in FIGS. 10 and 12, a holding portion 8 located on the lower side serves as the first holding portion 8a, and a holding portion 8 formed on the upper side serves as the second holding portion 8b. Therefore, from among the cutting resistance applied on the first cutting edge 5a as the active cutting edge, the holding portion 8 which mainly receives a principal component of force serves as the first holding portion 8a. Since a principal component of the force of cutting resistance mainly acts from upward to downward with respect to the active cutting edge, the first holding portion 8a formed on the lower side mainly receives such principal component of the force of cutting resistance. The second holding portion 8b is made to cooperate with the first holding portion 8a, whereby the cutting insert 1 is fixed to the insert seat 22 of the tool body 21. The first holding portion 8a has at least two contact surfaces 10 which are arranged so as to be distant from each other in a circumferential direction of the cutting insert 1. The two contact surfaces 10 are each formed as part of a recessed part 9 and are arranged so as to face each other. Further, the second holding portion 8b has at least one contact surface 10. The contact surface 10 of the second holding portion 8b is also formed as part of a recessed part 9. The two wall surface portions 22b1, 22b2 of the insert seat 22 and the three contact surfaces 10 come into contact with each other, whereby the cutting insert 1 is stably fixed to the tool body 21. As described above, the cutting insert 1 of the present embodiment is formed so as to be of a shape of 180-degree rotational symmetry, and the contact surfaces 10 of the second holding portion 8b are shaped and arranged so as to be 180-degree rotationally symmetrical with the contact surfaces 10 of the first holding portion 8a. In other words, four contact surfaces 10 are formed, and three of such contact surfaces 10 come into contact with the two wall surface portions 22b1, 22b2 of the insert seat 22.

As shown in FIGS. 7 to 12, the cutting tool 20 of the present embodiment is a tool for lathes. More specifically, the cutting tool 20 of the present embodiment is a small tool for small lathes which are also called Swiss lathes, i.e., a small turning tool. Since, as described above, the cutting insert 1 of the present embodiment is suited for grooving or parting, the cutting tool 20 is also suited for grooving or parting. The tool body 21 of the cutting tool 20 of the present embodiment has a shank whose cross-sectional shape is a square having 12 mm long sides. Small lathes allow for highly efficient cutting, and thus, a large number of cutting tools are mounted, in a closely arranged manner, on a gang tool post, etc. Thus, the cutting tool to be used is preferably a small tool which has a shank whose cross-sectional shape has sides which each range in length from approximately 10 mm to 16 mm. However, the cutting tool to be used is not limited thereto. The present invention is applicable to cutting tools for various uses, such as threading. Further, the present invention is not limited to a tool for small lathes and it can be applied to a tool which has a shank whose cross-sectional shape has sides which are each at least 20 mm long.

A clamping member 30 for the cutting tool 20 of the present embodiment is a fastening screw 30. The fastening screw 30 passes through a through hole of the cutting insert 1 and is screwed into a threaded hole formed in the insert seat 22. However, the clamping member 30 is not limited to the present embodiment. Various known methods for mounting a cutting insert 1, such as a lever clamping method, can be applied.

As described above, a wall surface of the insert seat 22 includes the wall surface portions 22b1, 22b2 as two surface portions. In other words, such wall surface includes the first wall surface portion 22b1, which comes into contact with the first holding portion 8a of the cutting insert 1, and the second wall surface portion 22b2, which comes into contact with the second holding portion 8b thereof. A wall surface, which is shown on the right side in FIG. 12, between the first wall surface portion 22b1 and the second wall surface portion 22b2, is formed so as not to be brought into contact with the cutting insert 1. Further, part of the wall surface is provided with an opening shown on the left side in FIG. 12. The cutting insert 1 is projected from this opening, whereby the first cutting edge 5a, being the active cutting edge, is projected with respect to the tool body 21. The first and second wall surface portions 22b1, 22b2 are shaped so as to respectively come into contact with the first and second holding portions 8a, 8b. In other words, the first wall surface portion 22b1 of the cutting tool 20 of the present embodiment has a projected curved surface part. The second wall surface portion 22b2 also has a projected curved surface part. However, the first and second wall surface portions 22b1, 22b2 of the insert seat 22 are not limited thereto and may have any shape, as long as they are capable of coming into contact with the first and second holding portions 8a, 8b of the cutting insert 1, respectively, and thereby fixing the cutting insert 1. As to the first and second wall surface portions 22b1, 22b2 of the insert seat 22, in order for the cutting insert 1 not to be moved even when cutting resistance is applied to the active cutting edge, at least two portions of the first wall surface portion 22b, which is located on the lower side, may come into contact with the two contact surfaces 10 formed in the first holding portion 8a of the cutting insert 1, and at least one portion of the second wall surface portion 22b2, which is located on the upper side, may come into contact with the contact surface 10 formed in the second holding portion 8b of the cutting insert 1. As described above, the cutting insert 1 is firmly and reliably fixed to the insert seat 22 when the first and second wall surface portions 22b1, 22b2 are arranged at positions apart from each other and when the cutting insert 1 and the wall surface of the insert seat 22 come into contact with each other at three portions which involve different directions of the contact surfaces 10.

A chip pocket 24 is formed on a leading end side of the tool body 21 and on the upper side thereof. The chip pocket is a space for smoothly discharging chips produced through grooving, parting, etc., to the outside of a groove to be machined.

The operation and effects of the respective configurations are described below. As described above, as viewed from the direction facing the rake surface 6, the first angle α is made smaller than the second angle β. If the central surface 2a is formed in this way, in the case of performing grooving on a corner of a workpiece having a flange portion, etc., as viewed from the direction facing the rake surface 6, in terms of the width of a groove to be machined which is defined by the first cutting edge 5a, which may also be referred to as the front cutting edge, the first corner cutting edge 5b and the second corner cutting edge 5c, the side flank 7b is relieved from a side surface of such groove, or a flange portion, etc., by the second angle β, and the central surface 2a bends at the first angle α and is thereby greatly relieved from such side surface or such flange portion, etc. In other words, variations in the above angles allow the gap between the workpiece and the central surface 2a to be increased. Thus, chips become less likely to become caught between the workpiece and the central surface 2a, and this suppresses or avoids damage to the cutting insert 1 and deterioration of the machining quality of the workpiece. In other words, the tool life of the cutting insert 1 is prolonged. Alternatively, the machining quality of the workpiece is improved. The first angle α is preferably formed so as to be from 75° to 87°. Further, a difference between the first angle α and the second angle β is preferably formed so as to be from 1° to 10°. The second angle β is preferably formed so as to be from 85° to 89°. By forming the cutting insert 1 with the above angle ranges, the gap between the workpiece and the central surface 2a has a necessary and sufficient size, and this suppresses or avoids damage to the cutting insert 1 and deterioration of the machining quality of the workpiece. If the second angle β is less than 85°, the width of the rake surface 6 is suddenly decreased, and this may lead to insufficient strength of the cutting insert 1. If the strength of the cutting insert 1 is insufficient, this may lead to a breakage of the cutting insert 1, which may result in constraints on the cutting conditions. If the second angle β exceeds 89° and approaches 90°, a gap between the side flank 7b and the workpiece is decreased, leading to chips being likely to become caught in such gap. If the first angle α is less than 75°, the strength of the cutting insert 1 may be insufficient, as with the case of the second angle β. If the first angle α exceeds 87°, the gap between the central surface 2a and the workpiece is decreased, leading to chips being likely to become caught in such gap.

The chip pocket 24 is preferably formed as a recessed curved surface which is recessed inward. The chip pocket 24 is formed so as to reduce obstacles which are projected upward with respect to the first cutting edge 5a serving as the active cutting edge. Without the provision of the upper projected part 23, the discharge of chips is smoothly performed without the chip pocket 24. However, as described above, the cutting insert 1 and the cutting tool 20 in the present embodiment require the second wall surface portion 22b2 which comes into contact with the second holding portion 8b, and thus, the tool body 21 needs to be provided with the upper projected part 23. Therefore, the chip pocket 24 is formed so as to discharge chips. The chip pocket 24 having a recessed curved surface shape is further preferably formed so as to have a curvature radius R which is from 2 mm to 20 mm in the side view (right side view) shown in FIG. 10. Such curvature radius R allows chips to be discharged more smoothly. When the curvature radius R is less than 2 mm, chips are likely to become caught in the chip pocket 24, and this hinders chips from being discharged smoothly. Conversely, when the curvature radius R exceeds 20 mm, the depth of the chip pocket 24 is insufficient, and its function of serving as a space (pocket) is therefore also insufficient.

Figure 8:
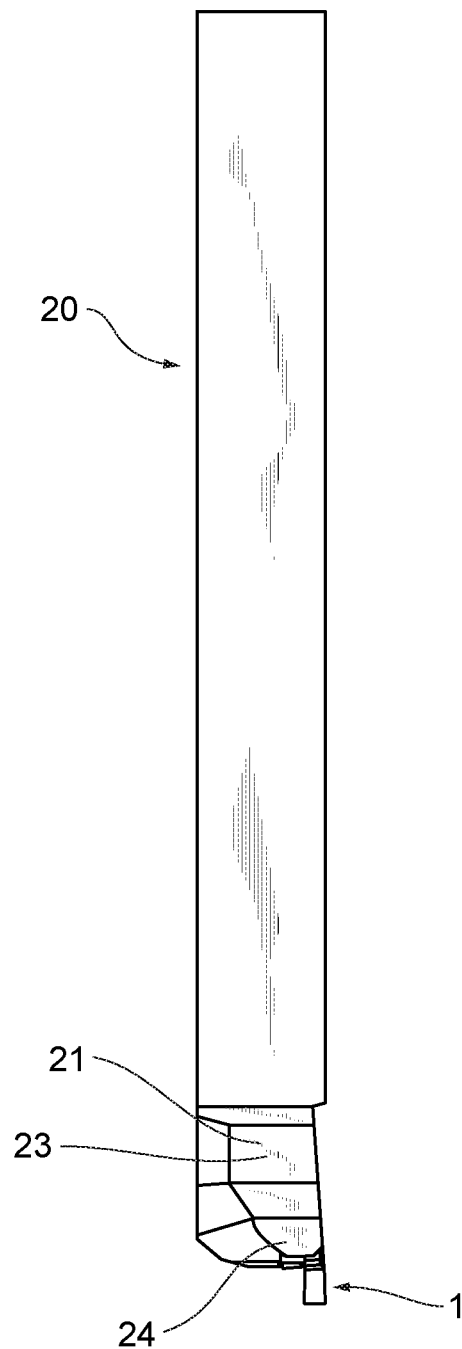
FIG. 8 is a plan view of the cutting tool shown in FIG. 7.
Figure 9:
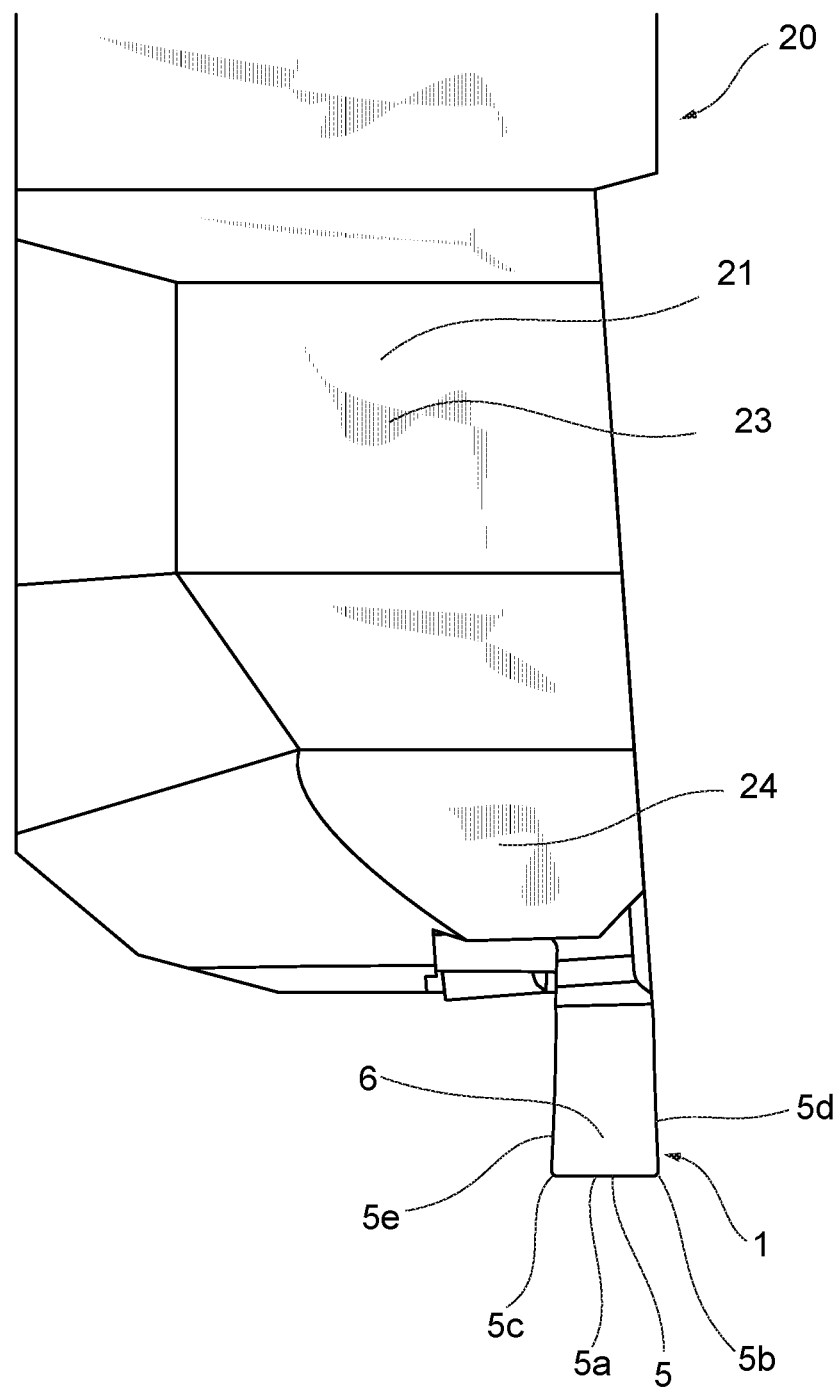
FIG. 9 is a partially enlarged view of FIG. 8.
Figure 10:
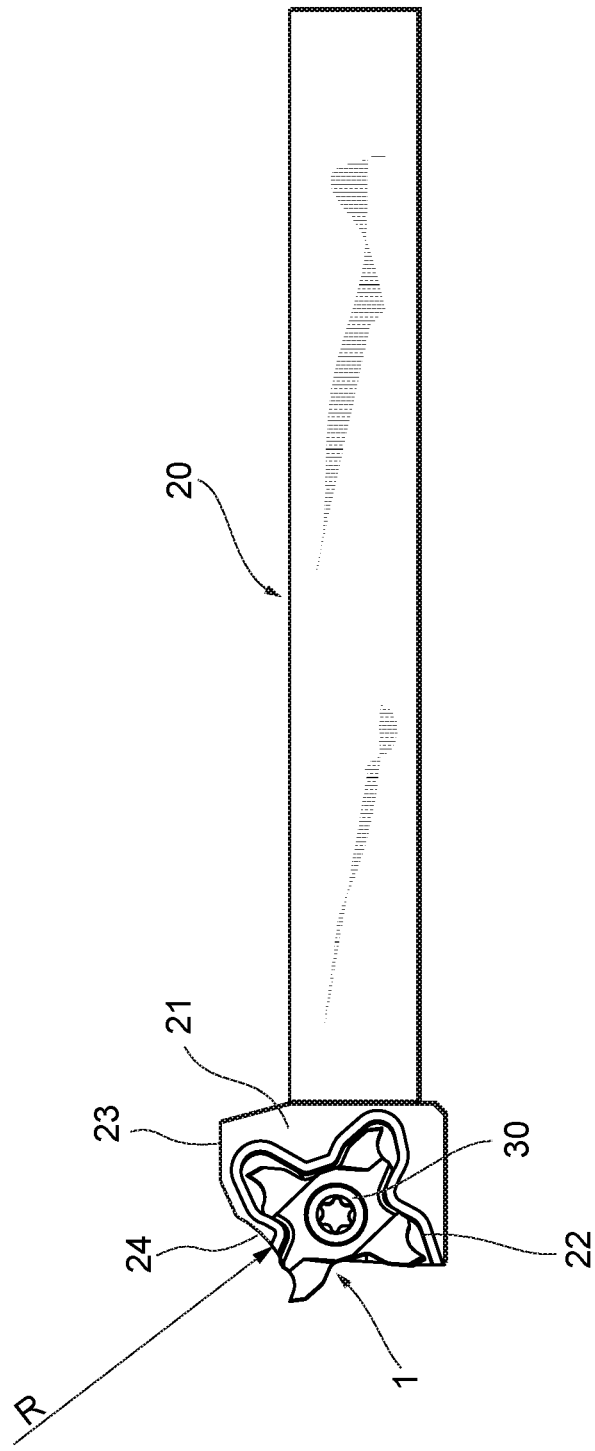
FIG. 10 is a right side view of the cutting tool shown in FIG. 7.
Figure 11:
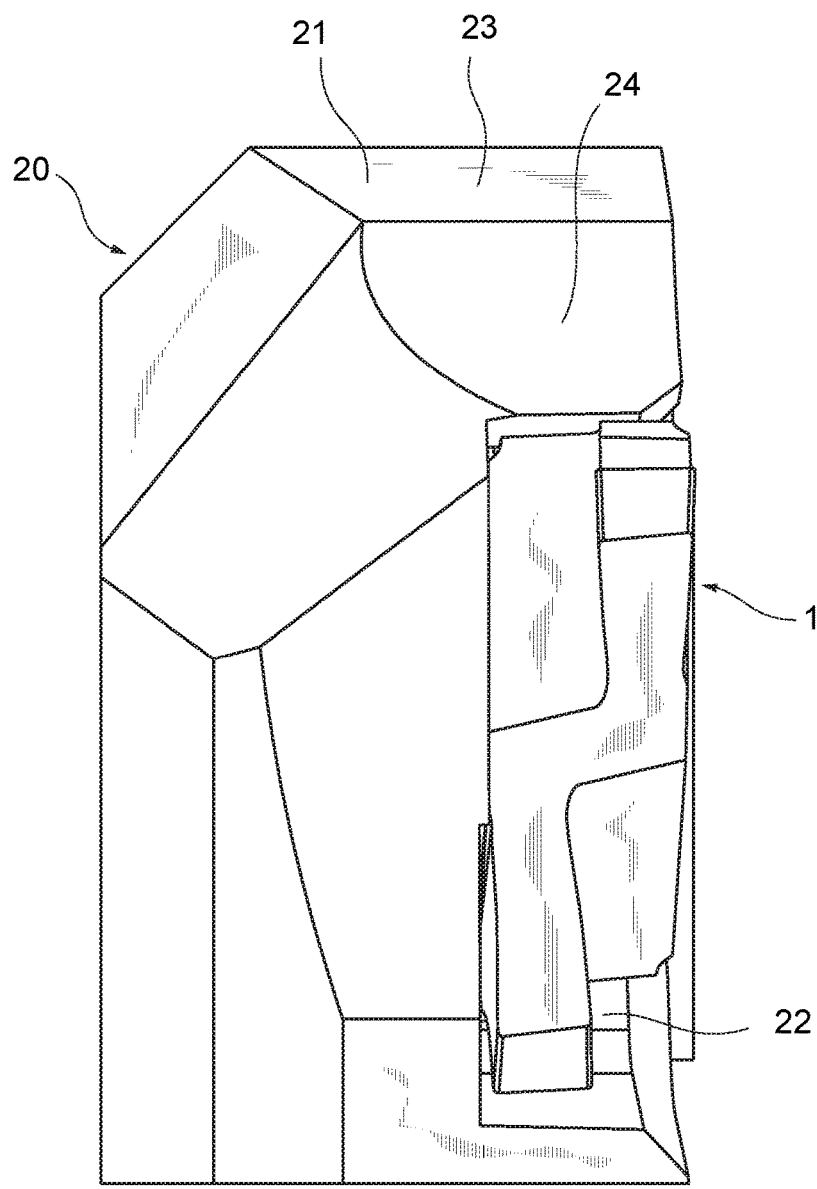
FIG. 11 is a front view of the cutting tool shown in FIG. 7.
Figure 12:
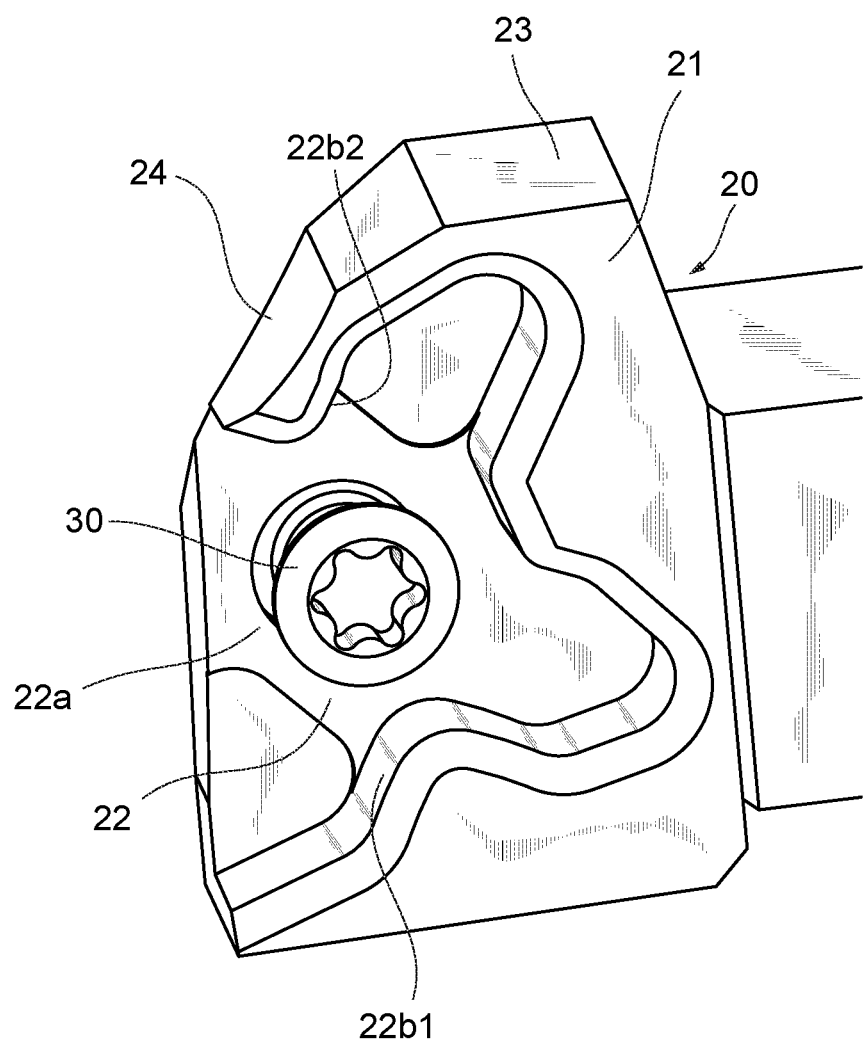
FIG. 12 is an enlarged perspective view of a state in which a cutting insert has been removed from the cutting tool shown in FIG. 7.

In the plan views of FIGS. 8 and 9, a leading-end side top part of the upper projected part 23 is formed so as to have a width which is gradually decreased toward the leading end. When the upper projected part 23 is formed in such shape, this gives rise to the synergistic effect with the chip pocket 24, leading to further improved discharging efficiency of chips. In the plan views, it is further preferable that a contour shape of the leading-end side top part of the upper projected part 23 has a streamline shape. However, the contour shape is not limited thereto and may be any shape, as long as it does not impede the discharge of chips.

The cutting insert 1 of the present invention can be manufactured by pressing and sintering of powder material. Further, a cutting insert with high dimension accuracy can be obtained through grinding after the sintering. The tool body 21 of the present invention can be manufactured by cutting.

The cutting insert and the cutting tool according to the present invention are not limited to the embodiments described above, and various modifications and additions may be made to such embodiments without departing from the gist of the present invention. For example, the present invention is not limited to a cutting tool for lathes and is also applicable to a rotary cutting tool.

REFERENCE SIGNS LIST

1 Cutting insert
2 First end surface
2a Central surface
3 Second end surface
4 Peripheral side surface
5 Cutting edge
5a First cutting edge
5b First corner cutting edge
5c Second corner cutting edge
5d First side cutting edge
5e Second side cutting edge
6 Rake surface
7a Front flank
7b Side flank
7c Corner flank
8a First holding portion
8b Second holding portion
9 Recessed part
10 Contact surface
11 First edge
12 Second edge
20 Cutting tool
21 Tool body
22 Insert seat
22a Bottom surface of the insert seat
22b1, 22b2 First and second wall surface portions of the insert seat
23 Upper projected part
24 Chip pocket
30 Fastening screw
R Curvature radius of the chip pocket
α First angle
β Second angle

What is claimed is:

1. A cutting insert having a first end surface, a second end surface opposing the first end surface, and a peripheral side surface connecting the first and second end surfaces, wherein:
    the peripheral side surface includes a rake surface, a front flank and a first cutting edge located in an intersecting edge between the rake surface and the front flank;
    the first end surface includes a central surface and a side flank located closer to the front flank than the central surface;
    as viewed from a direction facing the rake surface, an intersecting edge between the central surface and the peripheral side surface serves as a first edge, and an intersecting edge between the side flank and the peripheral side surface serves as a second edge; and
    when, as viewed from the direction facing the rake surface, an angle formed by the first cutting edge and the first edge serves as a first angle ($\alpha$), and an angle formed by the first cutting edge and the second edge serves as a second angle ($\beta$),
    the first angle ($\alpha$) is smaller than the second angle ($\beta$).

2. The cutting insert according to claim 1, wherein the second angle ($\beta$) is from 85° to 89°.

3. The cutting insert according to claim 1, wherein the first angle ($\alpha$) is from 75° to 87°.

4. The cutting insert according to claim 1, wherein an angle difference between the first angle ($\alpha$) and the second angle ($\beta$) is from 1° to 10°.

5. The cutting insert according to claim 1, wherein the cutting insert has side cutting edges which are provided, via respective corner cutting edges, on respective sides of the first cutting edge.

6. The cutting insert according to claim 1, wherein the cutting insert is used for parting or grooving.

7. The cutting insert according to claim 1, wherein:
    the peripheral side surface comprises at least two holding portions; and
    the holding portions respectively have recessed parts which respectively have contact surfaces.

8. A tool body of a cutting tool for having the cutting insert according to claim 1 removably mounted thereon, wherein the tool body comprises a bottom surface of an insert seat which comes into contact with the second end surface of the cutting insert.

9. The tool body according to claim 8, wherein:
the peripheral side surface of the cutting insert comprises at least two holding portions;
the two holding portions respectively have recessed parts which respectively have contact surfaces; and
the insert seat of the tool body comprises at least two wall surface portions which come into contact with the contact surfaces.

10. The tool body according to claim 9, wherein:
from among the holding portions of the cutting insert, the first holding portion is arranged on the rake surface side as viewed from the first cutting edge;
the first wall surface portion which comes into contact with the first holding portion is located on a leading end side of the tool body and on an upper side thereof;
the tool body has an upper projected part including the first wall surface portion; and
the upper projected part comprises at least one chip pocket.

11. The tool body according to claim 10, wherein the chip pocket is formed as a recessed curved surface which is recessed inward.

12. The tool body according to claim 11, wherein, in a side view, a curvature radius (R) of the chip pocket having a recessed curved surface shape is from 2 mm to 20 mm.

13. The tool body according to claim 10, wherein, in a plan view, a leading-end side top part of the upper projected part has a width which is gradually decreased toward the leading end.

14. A cutting tool comprising the cutting insert according to claim 1.

* * * * *